US006972708B1

(12) United States Patent
Tsui et al.

(10) Patent No.: US 6,972,708 B1
(45) Date of Patent: Dec. 6, 2005

(54) GPS RECEIVER WITH ELECTRONIC WARFARE RECEIVER FRONT END

(75) Inventors: James B. Y. Tsui, Dayton, OH (US); David M. Lin, Beavercreek, OH (US); Stephen L. Hary, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/815,600

(22) Filed: Apr. 2, 2004

(51) Int. Cl.$^7$ .............................................. G01S 13/06
(52) U.S. Cl. ...................... 342/13; 342/146; 342/196; 342/357.06; 342/417
(58) Field of Search ........................ 342/13, 56, 107, 342/111, 113, 115, 116, 146, 147, 192, 194, 342/196, 357.01, 357.06, 357.07, 357.08, 342/357.12, 417, 418, 450, 465

(56) References Cited

U.S. PATENT DOCUMENTS

| | | | |
|---|---|---|---|
| 5,119,504 A * | 6/1992 | Durboraw, III | 455/556.2 |
| 5,187,485 A * | 2/1993 | Tsui et al. | 342/357.08 |
| 5,606,500 A | 2/1997 | Tran | |
| 5,793,323 A | 8/1998 | Tsui | |
| 5,917,737 A | 6/1999 | Tsui et al. | |
| 5,963,164 A | 10/1999 | Tsui et al. | |
| 6,151,354 A * | 11/2000 | Abbey | 375/211 |
| 6,448,921 B1 | 9/2002 | Tsui et al. | |
| 6,448,925 B1 * | 9/2002 | Shridhara | 342/357.02 |
| 6,492,937 B1 | 12/2002 | Sparrow et al. | |
| 6,677,883 B2 | 1/2004 | Apostolos | |
| 6,690,315 B1 | 2/2004 | Schamus et al. | |
| 6,806,828 B1 * | 10/2004 | Sparrow et al. | 342/418 |
| 6,873,886 B1 * | 3/2005 | Mullen et al. | 701/2 |
| 2002/0145554 A1 * | 10/2002 | Lloyd et al. | 342/13 |

FOREIGN PATENT DOCUMENTS

JP         2000249754 A  *  9/2000  ............. G01S 5/14

OTHER PUBLICATIONS

"Euronav—a state of the art military GPS receiver", Aggarwal, A.K. Position Location and Navigation Symposium, 1988. Record. 'Navigation into the 21st Century'. IEEE Plans '88,IEEE Nov. 29-Dec. 2, 1988 P(s):153-164.*
U.S. Appl. No. 09/944,616, McCormick et al.
U.S. Appl. No. 10/008,476, Tsui et al.
James B.Y. Tsui, *Microwave Receivers with Electronic Warfare Applications*, ©1986, John Wiley & Sons.

* cited by examiner

*Primary Examiner*—John B. Sotomayor
(74) *Attorney, Agent, or Firm*—AFMCLO/JAZ; Gerald B. Hollins (57) ABSTRACT

A global position system radio receiver achieved through use of an electronic warfare receiver, and particularly one of the electronic warfare receiver output frequency channels, as a front-end signal processor for the global position system receiver. Electronic warfare receiver channel selection for such usage is described and the attenuating effect of electronic warfare receiver channel center frequency and global position system signal frequency differences are considered. A favorable comparison of present invention and conventional global position system receiver-generated results in processing a global position system signal are included along with control of a sampling frequency characteristic within the electronic warfare receiver in order to align global position system signal frequency and electronic warfare receiver channel location to an electable better degree.

19 Claims, 5 Drawing Sheets

GPS RECEIVER WITH ELECTRONIC WARFARE RECEIVER FRONT END

RIGHTS OF THE GOVERNMENT

The invention described herein may be manufactured and used by or for the Government of the United States for all governmental purposes without the payment of any royalty.

CROSS REFERENCE TO RELATED PATENT DOCUMENT

The present document is somewhat related to the copending and commonly assigned patent application document "PHASE CENTER MEASUREMENT OF ELECTRONIC WARFARE ANTENNAS USING GPS SIGNALS", Ser. No. 10/816,352 filed of even date herewith. The contents of this related even filing date application are hereby incorporated by reference herein.

BACKGROUND OF THE INVENTION

Global Position System (GPS) radio receivers and related apparatus have become widely used in navigation, precision locating, farming, warfare and numerous other present day applications including now factory assembled automobiles. In at least some of these applications there also exist a use of the Electronic Warfare Receiver (EWR) for identifying signals important to the ground, sea and air war fighter. Normally these two different technologies are considered to be separate and distinct in their uses as well as in the apparatus used for their embodiments. To a perhaps surprising degree however there has come to exist a number of applications where a joint usage or even a marriage of these different technologies can be advantageous. One useful of such application is disclosed in the companion patent document "Phase Center Measurement of Two Electronic Warfare Antennas Using GPS Signals", filed of even date herewith by one inventor of the present invention and another colleague from our laboratory. The contents of this companion patent document are hereby incorporated by reference herein. Other such combinations of these technologies are believed possible.

Another example of this advantageous marriage of GPS and electronic warfare technologies is to be found in a small tactical or reconnaissance military aircraft wherein the capabilities of both a high precision global position system receiver for locating functions and an electronic warfare receiver, the latter for defensive protection or for surveillance mission accomplishment, may be desirable. In the military aircraft situation limitations in the space and weight categories can make the availability of separate global position system and electronic warfare receiver equipment less than an optimum arrangement. In ground based military situations such as are encountered by Army and other Special Operations Forces these space and weight limitations may be in addition to energy availability limitations such as are imposed by the use of back-pack transported batteries. The present invention is believed to provide creditable assistance for such situations while incurring little technical limitation difficulty. As an aside topic we find it interesting to ponder why the simple concept of the present invention has apparently remained hidden for the number of years that both the global position system and electronic warfare receiver concepts have been known and in growing usage. One explanation for this status is surmised to involve the application of these two technologies being so separate and distinct as to make few if any workers in the electronic art knowledgeable and interested in both technologies and their specific details.

The combination of a global position system radio receiver with other radio receiver apparatus of varying capabilities, including military capabilities, is to be found in a sequence of previously issued U.S. Patent documents. These documents include the U.S. Pat. No. 5,606,500 of Tran; the U.S. Pat. No. 6,492,937 of M. J. Sparrow et al. and U.S. Pat. No. 6,677,883 of Apostolos for examples. While these combinations of global position system receivers and other receivers are interesting in their concepts, they appear concerned with the achievement of goals needing the reception of differing incoming signals as opposed to a sharing of receiver functions as appears in the present invention. Such receiver combinations are therefore believed to be primarily of background interest with respect to the present invention.

SUMMARY OF THE INVENTION

The present invention provides for a desirable combination of a global position system radio receiver and an electronic warfare radio receiver.

It is therefore an object of the present invention to provide a global position receiver and electronic warfare receiver combination.

It is another object of the invention to provide a global position system radio receiver in which the receiver front-end function is performed by an electronic warfare receiver.

It is another object of the invention to provide an additional usage for an electronic warfare radio receiver.

It is another object of the invention to provide a space, weight and electrical energy consumption limited combination of an electronic warfare radio receiver and a global position system radio receiver.

It is another object of the invention to provide an electronic warfare radio receiver with global position system receiver capability.

It is another object of the invention to provide a wide bandwidth global position system receiver having the ability to process simultaneously received signals.

It is another object of the invention to provide a combination of a global position system radio receiver with one of several types of electronic warfare radio receivers.

These and other objects of the invention will become apparent as the description of the representative embodiments proceeds.

These and other objects of the invention are achieved by the integrated GPS radio receiver apparatus comprising the combination of:

a wide band electronic warfare radio receiver having a plurality of channelized output signal paths each limited to a selected band of radio frequency signals;

said wide band electronic warfare radio receiver also including an electronic analog to digital converter circuit and an embodied Fourier transformation algorithm;

a global position system radio receiver circuit having a radio frequency signal input port electrically connected with a selected one of said wide band electronic warfare radio receiver plurality of channelized output signal paths in receipt of input radio frequency signals there from;

said global position system radio receiver circuit generating a sequence of geographic location identification output signals in response to a sequence of global position system input signals received from said selected electronic warfare radio receiver channelized output signal.

BRIEF DESCRIPTION OF THE DRAWING

The accompanying drawings incorporated in and forming a part of the specification, illustrate several aspects of the present invention and together with the description serve to explain the principles of the invention. In the drawings.

DETAILED DESCRIPTION OF THE INVENTION

In order for a digital electronic warfare radio receiver to cover a wide bandwidth, the analog-to-digital converter used in the receiver should be characterized by a high sampling rate. Once this capability is in place however there are numerous additional types of signals, (in addition to the usual electronic warfare signals originating in a radar system) signals such as communication signals, which can be received by way of an electronic warfare receiver. Thus by implementing different algorithms to process the output of a channelized electronic warfare receiver, other non-electronic warfare functions can be performed by the receiver. These functions include receiver use in the front-end function of a global position system receiving apparatus—as is espoused in the present invention. This approach can add additional usability and cost justification to an electronic warfare receiver. Alternately one may consider that the two types of receivers, an electronic warfare receiver, and a global position system receiver, can be integrated.

In order to illustrate this receiver combination concept an electronic warfare receiver and a global position system receiver are integrated and described in the following paragraphs herein. To simplify the discussion, the monobit arrangement of the electronic warfare receiver as is described in our (i.e., our laboratory and our colleagues) U.S. Pat. No. 5,917,737 is used as the channelized electronic warfare receiver and is combined with a software-embodied global position system receiver. Another type of electronic warfare radio receiver can be used in substitution for this monobit receiver; such possible receivers may for example include the arrangements shown in other of our U.S. patents including U.S. Pat. No. 5,793,323; U.S. Ser. No. 09/917, 589; U.S. Ser. No. 09/944,616 and U.S. Ser. No. 10/008,476. Other types of electronic warfare receivers including the several of these receivers identified in the Text "Microwave Receivers With Electronic Warfare Applications" by J. B. Y. Tsui, John Wiley and Sons, ©1986 may also be employed in realizing the invention when the simplicity and other characteristics of the monobit receiver are not essential or are undesirable. A significant aspect of the monobit receiver and the other receivers disclosed in our patents concerns the use of approximated Kernel function values in the Fourier transformation portion of the receiver and the limitations of multiple signal dynamic range characteristics in the receiver that can result. The contents of each of the issued and pending patents, texts and other publications identified herein are hereby incorporated by reference herein.

Global position system radio receivers are now also known in the patent art. Receivers of this type are for example disclosed in U.S. Pat. Nos. 5,805,210; 6,031,488; 6,121,921; 6,324,473; 6,619,212 and RE 37,256. Global position system data links are also known in the art and are for examples disclosed in U.S. Pat. Nos. 5,691,723; 5,929, 783; 6,160,858; 6,278,396; 6,204,807 and 6,271,798. Global position system apparatus of one or more of these types may be helpful in achieving embodiments of the present invention.

The analog-to-digital converter used in the monobit global position system receiver has a two-bit capacity and samples at a 2.5 gigahertz rate. The analog-to-digital converter bandwidth is thus 1.25 gigahertz, which is half the sampling frequency. The receiver performs a 256-point fast Fourier transform. The fast Fourier transform of the receiver Kernel function uses only four Kernel function approximation points on a unit circle; these points are located at ±1 and ±j in the complex plane. Kernel function approximation points of this nature are disclosed in several previous patents originating in our laboratory, patents including the above-identified U.S. Pat. No. 5,917,737. The purpose of this approximation Kernel function is of course to make the Fourier transformation calculation simple. The monobit receiver may employ 128 output channels and the channel bandwidth for each of these 128 channels is about 9.77 megahertz (i.e., 1.250 gigahertz/128). If however only the real or the imaginary component portion of each monobit receiver output channel is used the bandwidth is reduced to one half of this 9.77 megahertz. Significantly for present purposes, such bandwidth is sufficient to accommodate the bandwidth needs of the coarse/acquisition (CA) code of a global position system signal, a bandwidth of 2.046 MHz from null to null.

Figure 1:
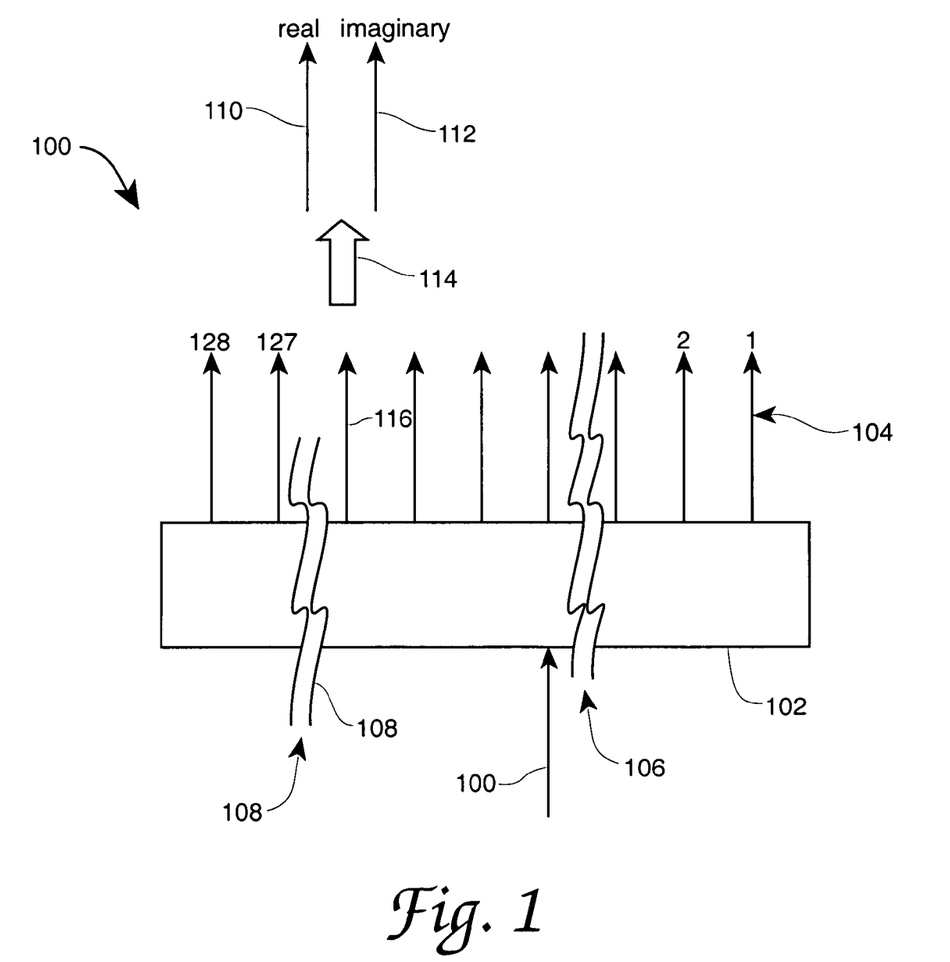
FIG. 1 shows a block diagram of a monobit type of electronic warfare receiver having 128 output signals.

FIG. 1 in the drawings shows an arrangement for using one of the electronic warfare receiver channel outputs in the present global position system receiver front-end service. The frequency of the selected channel output must be very close to the center frequency of the global position system signal, a center frequency located at 1.57542 gigahertz. In the FIG. 1 drawing input signals are received along the path 100 to the receiver 102 and output signals are presented on the 128 numbered output paths or channels shown at 104. The cutting lines at 106 and 108 in FIG. 1 indicate the omission of several receiver output channels falling intermediate the represented output signal channels. The arrow 114 in the FIG. 1 drawing indicates the presence of a complex signal on the path 116, this complex signal includes the real and imaginary component parts indicated at 110 and 112 respectively. If both the real and imaginary component parts of the signal 114 are used as input to a global position system receiver, the used bandwidth is 9.77 megahertz. If only the real or imaginary components are used, the bandwidth is one-half of this or 4.88 megahertz (9.77/2.) This 4.88 megahertz bandwidth is in fact sufficient to accommodate the C/A code of the global position system signal.

Figure 2:
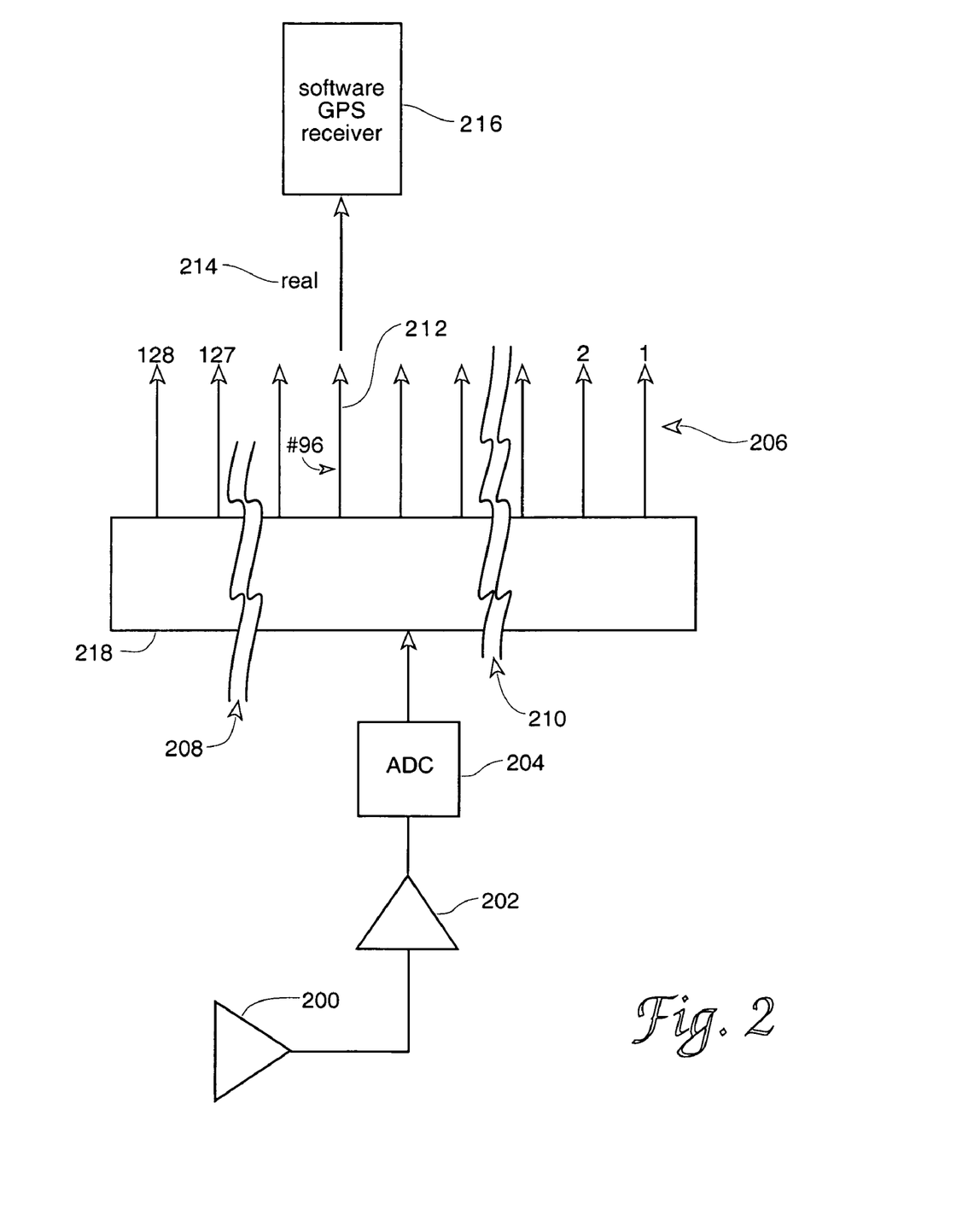
FIG. 2 shows additional detail of a FIG. 1 monobit electronic warfare receiver including output signal identifications and use of an output signal according to the present invention.

The first monobit receiver fabricated provides an input frequency range from 1.25 to 2.5 gigahertz as the input pass band. This frequency range in fact includes the global position system-related frequency of 1.57542 gigahertz. With this arrangement the global position system input signal can be sampled directly by the monobit receiver and there is no frequency conversion required. The resulting front-end arrangement of the monobit receiver is shown in the drawing of FIG. 2. In the FIG. 2 circuit a global position system input signal received from the antenna 200 is amplified at 202 for application to the high-speed analog-to-digital converter 204. The output from the analog-to-digital converter 204 is divided into the one hundred twenty eight channels indicated at 206 in the fast Fourier transform channelizer indicated at 218. The break lines at 208 and 210 again indicate the absence of showing intermediate circuits and output channels in the channelizer 218. As indicated in the FIG. 2 drawing the real component of the ninety sixth output channel of the represented one hundred twenty eight channels contains the desired band of frequencies for present global position system use.

Figure 6:
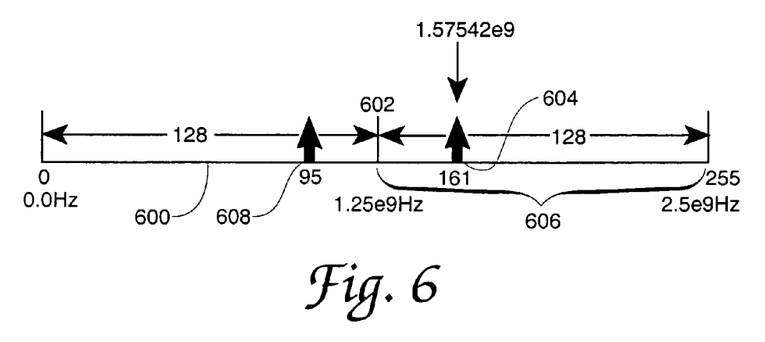
FIG. 6 shows a frequency plot for a fast Fourier transform processed wide band electromagnetic wave signal.

FIG. 6 in the drawings illustrates the manner in which the previously recited one hundred twenty eight frequency segregated channels following a Fourier transformation operation arises as well as why the ninety sixth one of these one hundred twenty eight channels is of particular global position system interest in the described embodiment of the invention. In the FIG. 6 drawing the straight line 600 may be understood to represent the frequency spectrum between zero frequency and a frequency of $2.5 \times 10^9$ Hertz (i.e., 2.5 gigahertz) and is thus also representative of the number of channels created while performing the 256 point fast Fourier transformation of an input signal as described above. The mid point 602 of the line 600 also thus represents a frequency of $1.25 \times 10^9$ Hertz.

On the left side of the midpoint 602 lie one hundred twenty eight of the two hundred fifty six channels originating in the fast Fourier transform operation and on the right side lie the remaining one hundred twenty eight channels. These channels may be numbered as zero through one hundred twenty seven and one hundred twenty eight though two hundred fifty five respectively and thus the midpoint 602 may be said to lie between channels 127 and 128. Only one of these left side and right side channel groupings is however needed in the monobit receiver since the FIG. 6 spectrum is symmetric and dual in nature; let us assume briefly the right side channel grouping and the portion 606 of the spectrum line 600 is thus elected. At a point 604 along this portion 606 is located the frequency of $1.57542 \times 10^9$ Hertz, the global position system center frequency described above. The precise bin number location of this point 604 may be ascertained from the FIG. 6 drawing through the use of a mathematical proportion relationship wherein 1.57542/2.5= channel location/256. This equation of proportion solves to the channel location being at 161.32 or in the 161$^{st}$ channel location. By way of the symmetrical nature of the FIG. 6 spectrum there is located at a corresponding channel location 608 on the left side of the center point 602, an image of the point 604, an image located an equal 33 bins away from the point 602 and the junction between channels 127 and 128. This point 608 is located in bin 95 i.e., in the 96$^{th}$ channel from the left end of line 600 as stated herein.

Figure 3:
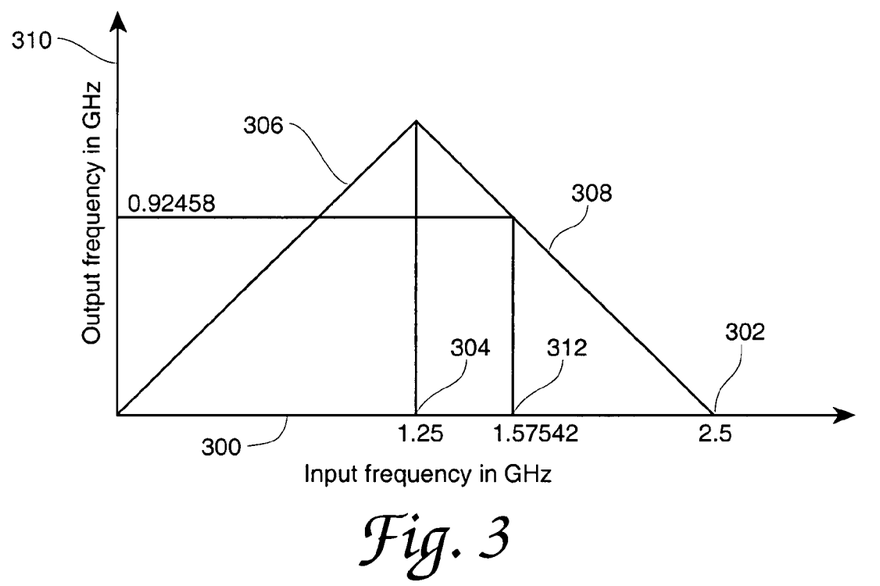
FIG. 3 shows input and output frequency relationships for a receiver combination according to the present invention.

The additional frequency plan appearing in the FIG. 3 drawing herein is somewhat similar to the FIG. 6 drawing and additionally shows the frequencies involved in the present invention and their interrelationships. In the FIG. 3 drawing input frequency of the fast Fourier transform operation is represented along the horizontal axis 300 and output frequency along the vertical axis 310. As these axis names imply, the FIG. 3 drawing may also be considered to represent an input/output frequency plan for the present invention sampling operation. Thus in FIG. 3 the above-described 2.5 gigahertz pass band of the analog-to-digital converter 204 appears along the horizontal axis line 300 and may be considered to end (and another replication of the FIG. 3 relationship commence) at the frequency point 302. The 1.25 gigahertz mid point of this 2.5 gigahertz pass band is indicated at 304 and the rising and falling band pass slopes abutting this midpoint appear at 306 and 308. The 1.57542 gigahertz center frequency of a global position system signal appears at 312 in the FIG. 3 drawing and may be seen in FIG. 3 to result in an output frequency of 0.92458 gigahertz (i.e., 2.5 gigahertz−1.57542 gigahertz= 0.92458 gigahertz) from the FIG. 3 represented down conversion operation. Thus the 1.57542 gigahertz center frequency of the global position system signal at 312 again falls within the output channel 96 of the electronic warfare receiver. Moreover the location of the 1.57542 gigahertz center frequency is about 3.15 megahertz off the center frequency of channel 96.

As a result of this 3.15 megahertz center frequency offset the signal strength achieved with the present combination of an electronic warfare receiver with a global position system receiver will be attenuated by about 1.54 dB. with respect to that achievable with a conventional global position system receiver. This result can be calculated by way of the two relationships:

$$x=3.15\pi/9.77=9.8960085/9.77=1.012897 \quad \text{attenuation}=20\log[(\sin 1.012897)/1.012897]=-1.5396 \quad (1)$$

In the relationships shown as equation 1, the variable x represents the frequency off from zero.

In order to verify the performance sought after in the combination electronic warfare receiver and global position system receiver an actual global position system signal may be collected through use of a Tektronix TDS7000 digital oscilloscope and this signal processed both according to the present invention global position system receiver and according to a conventional global position system receiver and the results compared. Such a comparison results in the FIG. 4 and FIG. 5 drawings herein.

Figure 4:
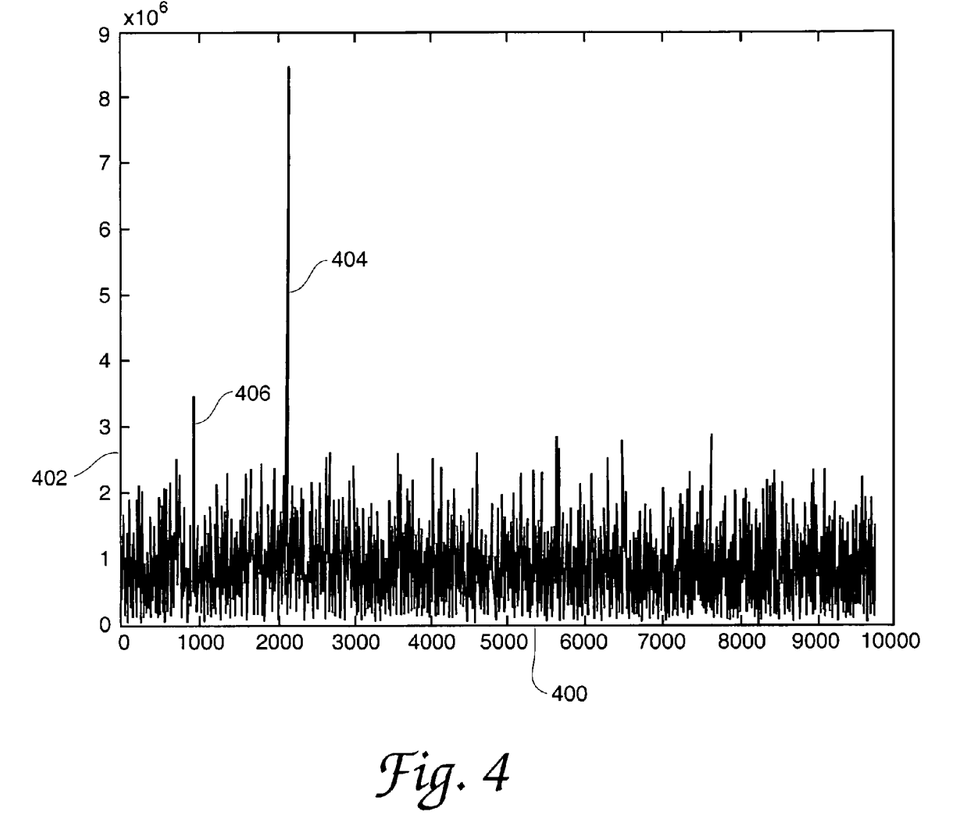
FIG. 4 shows signal to noise performance of a combined receiver according to the present invention.

In the FIG. 4 drawing the horizontal scale at 400 represents time expressed in sample units and the vertical scale 402 represents signal amplitude as measured in relative strength units. The spike at 404 is not an actual signal but represents an additional portion of the noise background appearing at the floor of FIG. 4. The signal at 406 represents the desired output. The FIG. 4 drawing represents results achieved by way of the present invention use of an electronic warfare receiver as the front end of a global position system receiver. By comparing the amplitude of the signal 406 with the average output represented in FIG. 4, a signal-to-noise ratio of about 17.6 dB. is calculated for the FIG. 4 present invention processing.

Figure 5:
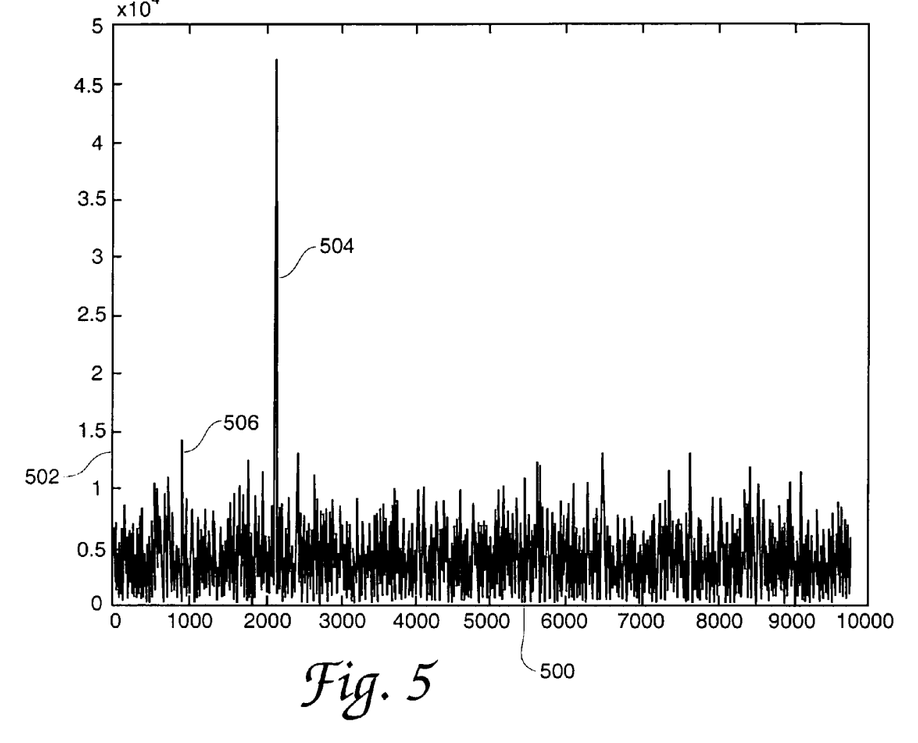
FIG. 5 shows signal to noise performance of a conventional electronic warfare receiver under the conditions of FIG. 4.

In the FIG. 5 drawing the horizontal scale at 500 also represents time expressed in sample units and the vertical scale 502 represents signal amplitude as measured in relative strength units. The signal at 506 again represents the desired output. By comparing the amplitude of the signal 504 with the average output represented in FIG. 4, a signal-to-noise ratio of about 19.32 dB. is calculated for the FIG. 5 conventional processing arrangement. The present invention output shown in FIG. 4 is thus found to provide a slightly less desirable, 1.7 dB different, signal to noise ratio than the conventional processing of similar signals. A significant part of this difference can be attributed to the offset in frequency between the received global position system signal and the location of the channel center of the utilized electronic warfare receiver channel.

Even though this 1.7 dB degradation in signal to noise ratio may be largely attributed to this frequency offset aspect of the present invention and this degradation is not so large as to pose a significant disadvantage from use of the invention, it is possible to largely overcome even this limited signal to noise degradation and achieve a better alignment of the electronic warfare receiver channel with the global position system signal merely through a change in the sampling frequency used in the analog to digital converter of the electronic warfare receiver. In fact if this sampling frequency is increased by a quite small amount then the frequency of the global position system signal will be exactly at bin 96. The change in sampling frequency needed for this signal to noise improvement is from 2.5 Gigahertz or $2.5 \times 10^9$ Hertz to a frequency of $2.505015652173913 \times 10^9$ Hertz.

It appears within reason for one reading this specification or possibly otherwise contemplating this document to ask wherein the advantage of employing the present invention receiver combination may lie. After all, the imperfect alignment of electronic warfare receiver and global position system receiver frequencies as described herein can be expected to extend to many combinations of such receivers and result in the slightly decreased performance experienced in the present combination when compared with a conventional receiver arrangement and the disclosed correction of this alignment may not always be convenient. In addition the global position system radio frequency amplifier and converter stages replaced by an electronic warfare receiver in the present invention are in themselves usually small in physical size and mass. Notwithstanding these facts however a combination of electronic warfare and global position system receivers offers an advantage in settings wherein both receiver types are already needed and wherein extreme limitations of space or weight or energy consumption or combinations of these factors are imposed. The disclosed combination of receivers is also of definite advantage in the situation described in the above identified antenna positioning measurement situation and the related patent document.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. Integrated GPS radio receiver apparatus comprising the combination of:
    a wide band electronic warfare radio receiver having a plurality of channelized output signal paths each limited to a selected band of radio frequency signals;
    said wide band electronic warfare radio receiver also including an electronic analog to digital converter circuit and an embodied Fourier transformation algorithm;
    a global position system radio receiver circuit having a radio frequency signal input port; and said signal input port being
    electrically connected with a selected one of said wide band electronic warfare radio receiver plurality of channelized output signal paths in receipt of input radio frequency signals there from;
    said global position system radio receiver circuit generating a sequence of geographic location identification output signals in response to a sequence of global position system input signals received from said selected electronic warfare radio receiver channelized output signal.

2. The integrated GPS radio receiver apparatus of claim 1 wherein said embodied Fourier transformation algorithm generates a total of 2N output frequency channel signals of N channel and N channel symmetric distribution along a frequency axis and wherein said global position system radio receiver circuit is connected with a single one of said frequency channel signals.

3. The integrated GPS radio receiver apparatus of claim 2 wherein said embodied Fourier transformation algorithm generates a total of two hundred fifty six output signal frequency channels and wherein one hundred twenty eight of said output signal frequency channels are used in said electronic warfare radio receiver.

4. The integrated GPS radio receiver apparatus of claim 1 wherein said wide band electronic warfare radio receiver includes an approximated Kernel function Fourier transformation realization.

5. The integrated GPS radio receiver apparatus of claim 4 wherein said approximated Kernel function Fourier transformation includes four Kernel function approximation points.

6. The integrated GPS radio receiver apparatus of claim 1 wherein said approximated Kernel function Fourier transformation includes a combination of unit circle and unit circle-adjacent Kernel function approximation points.

7. The integrated GPS radio receiver apparatus of claim 1 wherein said electronic warfare radio receiver plurality of channelized output signal paths each include both real and imaginary component parts and wherein one of said component parts is used in said global position system radio receiver circuit.

8. The integrated GPS radio receiver apparatus of claim 1 wherein said electronic warfare radio receiver includes an output signal channel of center frequency located within four megahertz of a 1.57542 Gigahertz global position system signal.

9. The integrated GPS radio receiver apparatus of claim 1 wherein said wide band electronic warfare radio receiver analog to digital converter circuit operates at a sampling rate above two gigahertz and generates a two hundred fifty six point Fourier transformation.

10. The integrated GPS radio receiver apparatus of claim 1 wherein said electronic warfare radio receiver includes an output signal channel of center frequency less than four megahertz difference frequency from a 1.57542 Gigahertz global position system signal and said less than four megahertz difference frequency is achieved in response to selection of an appropriate electronic warfare radio receiver analog to digital converter circuit sampling rate.

11. The integrated GPS radio receiver apparatus of claim 1 wherein said wide band electronic warfare radio receiver embodied Fourier transformation algorithm is a fast Fourier transformation algorithm.

12. The method of generating geographic position indicating data from electromagnetic wave communicated global position system radio frequency signals, said method comprising the steps of:
    communicating electrical signals representing said electromagnetic wave-communicated global position system radio frequency signals to an input signal port of a wide band electronic warfare radio receiver;
    forming from said global position system signals in said wide band electronic warfare radio receiver a plurality of frequency-channelized electronic warfare receiver output radio frequency signals using an embodied Fourier transformation algorithm processing;

coupling an input signal port of a global position system radio receiver to a selected one of said frequency-channelized electronic warfare receiver output radio frequency signals; and generating, in said global position system radio receiver, geographic position indicating data determined by said selected electronic warfare receiver output radio frequency signals.

13. The method of generating geographic position indicating data from electromagnetic wave communicated global position system radio frequency signals of claim 12 wherein said selected one of said frequency-channelized electronic warfare receiver output radio frequency signals is chosen to have a frequency adjacent a characteristic center frequency of a global position system signal.

14. The method of generating geographic position indicating data from electromagnetic wave communicated global position system radio frequency signals of claim 13 wherein said selected one of said frequency-channelized electronic warfare receiver output radio frequency signals and said characteristic center frequency of a global position system signal are segregated by a frequency difference generating less than two decibels of signal to noise attenuation in said global position system signal.

15. The method of generating geographic position indicating data from electromagnetic wave communicated global position system radio frequency signals of claim 13 further including the step of determining an analog to digital converter circuit sampling rate in said wide band electronic warfare radio receiver in response to disposing said selected one of said frequency-channelized electronic warfare receiver output radio frequency signals within a selected difference frequency of said characteristic center frequency of said global position system signal.

16. The method of generating geographic position indicating data from electromagnetic wave communicated global position system radio frequency signals of claim 15 wherein said step of determining an analog to digital converter circuit sampling rate in said wide band electronic warfare radio receiver determines a frequency of $2.505015652173913 \times 10^9$ Hertz and wherein said determined sampling rate disposes said selected one of said frequency-channelized electronic warfare receiver output radio frequency signals at a frequency bin 96 location.

17. The method of generating geographic position indicating data from electromagnetic wave communicated global position system radio frequency signals of claim 12 wherein said plurality of frequency-channelized electronic warfare receiver output radio frequency signals are one hundred twenty eight in number and wherein said selected one of said radio frequency signals is a ninety sixth of said radio frequency signals away from a zero frequency signal.

18. The method of generating geographic position indicating data from electromagnetic wave communicated global position system radio frequency signals of claim 12 wherein said electronic warfare radio receiver includes an operating step of approximating a Fourier transformation Kernel function with a plurality of unit magnitude values.

19. The method of generating geographic position indicating data from electromagnetic wave communicated global position system radio frequency signals of claim 12 wherein said global position system signal includes a C/A code signal component.

* * * * *